A. F. MROCK.
MACHINE FOR SHIRRING CLOTH AND OTHER MATERIALS.
APPLICATION FILED SEPT. 29, 1908.
1,042,715.
Patented Oct. 29, 1912.
2 SHEETS—SHEET 2.
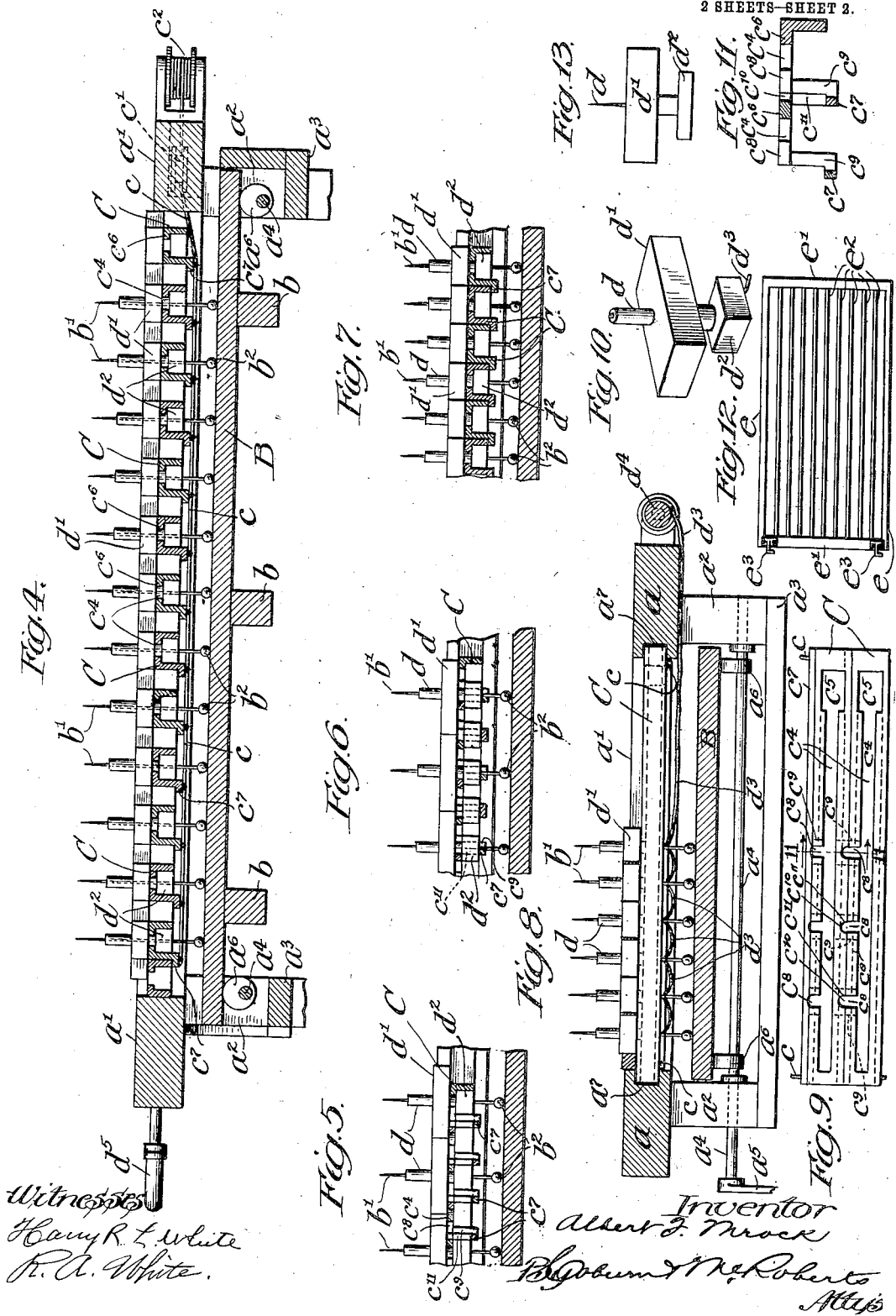

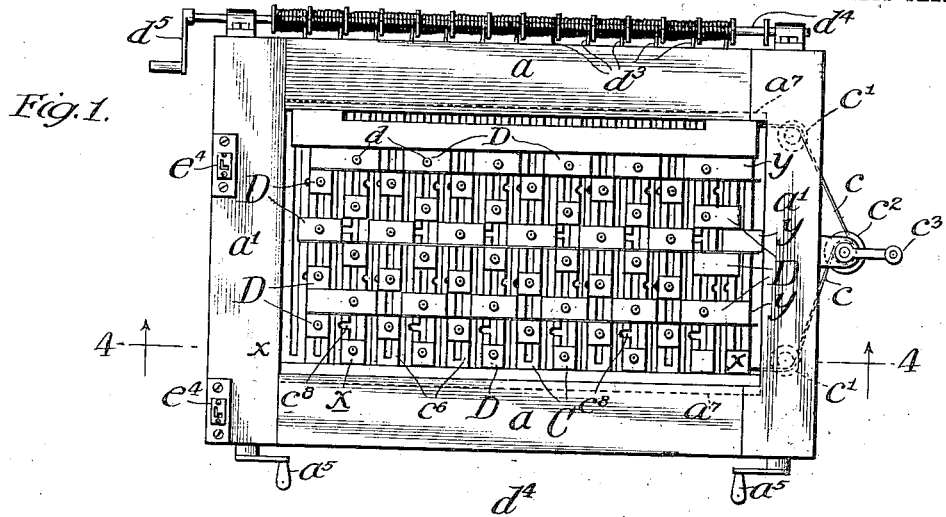
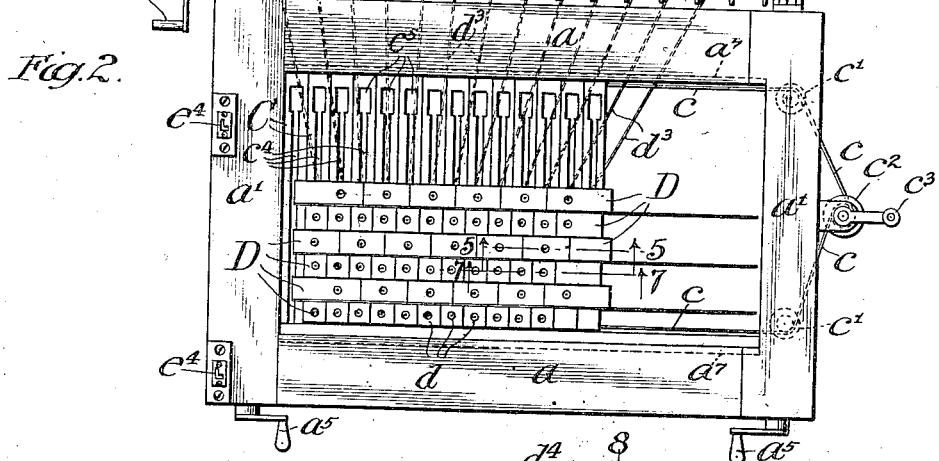
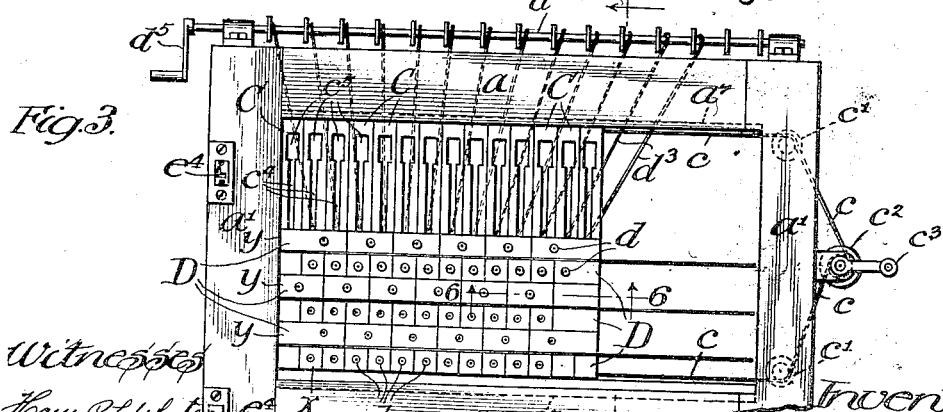

UNITED STATES PATENT OFFICE.

ALBERT F. MROCK, OF CHICAGO, ILLINOIS, ASSIGNOR TO TUFTING MACHINE SUPPLY COMPANY, OF CHICAGO, ILLINOIS, A CORPORATION OF ILLINOIS.

MACHINE FOR SHIRRING CLOTH AND OTHER MATERIALS.

1,042,715.  Specification of Letters Patent.  Patented Oct. 29, 1912.

Application filed September 29, 1908.  Serial No. 455,342.

*To all whom it may concern:*

Be it known that I, ALBERT F. MROCK, a citizen of the United States, residing at Chicago, in the county of Cook and State of Illinois, have invented certain new and useful Improvements in Machines for Shirring Cloth and other Materials, of which the following is a specification, reference being had therein to the accompanying drawing.

My invention relates to a novel method of and machine for shirring cloth and other fabrics or materials, and consists in the matters hereinafter described and then pointed out in the appended claims.

In the accompanying drawings I illustrate a practical embodiment of my invention as now practiced by me, and in these drawings, Figure 1 is a top plan view of a machine embodying my invention and upon which my method may be carried out, the gatherers being shown in expanded or open position to receive the cloth to be shirred; Fig. 2 is a similar view of the same machine but showing the gatherers closed or contracted for puckering or fulling the fabric to make one form of shirr; Fig. 3 is a view similar to Fig. 2 (with one corner broken away), but showing certain of the gatherers in different position to make a different form of shirr. Fig. 4 is a longitudinal sectional view on the line 4—4 of Fig. 1; Fig. 5 is a detail sectional view on the line 5—5 of Fig. 2; Fig. 6 is a similar view on the line 6—6 of Fig. 3; Fig. 7 is a similar view on the line 7—7 of Fig. 2; Fig. 8 is a cross-sectional view on the line 8—8 of Fig. 3; Fig. 9 is a detail top plan view of a pair of the movable gathering bars; Fig. 10 is a detail view of one of the gatherers; Fig. 11 is a sectional view on the line 11—11 of Fig. 9; Fig. 12 is a top plan view of a follow-board, and Fig. 13 is a detail view of a modified form of gatherer.

The present method of shirring cloth or other fabrics or materials according to the principle of my invention may be best understood by reference to a machine upon which the same may be practised, although it is to be understood that the method is not merely the function of the machine but may be practised in whole or in part by manual manipulation of certain of the parts. Therefore, for the purpose of disclosing both the method and a machine upon which the same may be carried out, I will now proceed to describe the apparatus illustrated in the accompanying drawings.

The reference letters $a$ and $a'$ represent the sides and ends respectively of an open rectangular frame of suitable size and dimensions corresponding to the size of the material to be shirred, it being of course understood that the size of this frame may be varied to correspond with or provide for materials of various sizes according to the desired dimensions of the finished article. The frame is provided upon its under face with corner standards $a^2$, and the end pairs of standards are connected together by suitable end pieces $a^3$, by means of which the apparatus may be supported or carried upon a suitable table or other support. The corner standards may be angular in form, and are adapted to furnish bearings for a pair of transverse shafts $a^4$, each of which is provided with a suitable operating handle $a^5$. Each shaft carries a pair of cams $a^6$, suitably spaced apart, as shown for example in Fig. 8, and by means of which a rectangular pin-board B resting thereupon is adapted to be raised and lowered toward and away from the frame, the parts being so related that the pin-board is below the frame as clearly shown in Figs. 4 and 8. As it is desired to have the pin-board present a uniform surface over which the gathering pins may easily travel, as hereinafter pointed out, it is provided with one or more transverse braces $b$, as shown in Fig. 4, to prevent warping. The frame is adapted to support a series of movable gatherers, which carry the fabric or material and are adapted to be contracted or closed to produce a puckering or fulling of the fabric to be shirred, in a manner and by means hereinafter pointed out.

The side pieces $a$ of the frame are grooved on their inner faces as at $a^7$ to provide tracks or ways in which a series of transversely extending gathering-bars C are slidably or movably supported, the bars being connected at their ends by cables or cords $c$ which pass around suitable guides $c'$ at one end of the frame and are wound upon a drum or shaft $c^2$ suitably journaled in one of the end pieces of the frame and having a winding handle $c^3$. The gathering-bars are connected to their cables at suitable distances apart so that when the bars are drawn out or separated by winding up their cables they will be suitably spaced apart or expanded as shown in Figs. 1 and 4, which illustrate the expanded position of the gatherers when the material to be shirred is positioned upon them. Each of the gathering-bars is substantially rectangular in outline and is provided with a longitudinal slot $c^4$ extending to a point near each end thereof, each slot being enlarged at one end, as at $c^5$, for a purpose to be hereinafter described. The gathering-bars are cut away or grooved longitudinally along their lower surfaces or faces so as to have an open lower side in cross-section and their slots are of less width than the grooves or cut away portions in order to provide overlying top flanges $c^6$, for a purpose to be hereinafter described. Each of the bars (except the end bar at the left of Fig. 4) is provided at the lower edge of its side adjacent the next bar with a laterally projecting wing $c^7$ which is adapted to take under the body of the adjacent bar when the bars are brought together for the purpose of contracting the gatherers, the arrangement of parts being fully illustrated in Figs. 4 to 11. The gatherers are adapted to slide in the bars and may be of any suitable form; when pins $b'$ having heads $b^2$, as here illustrated are employed, these gatherers are preferably in the form of hollow tubes or cylinders through which the pins are adapted to pass and by which the positions of the pins are expanded and contracted. In the drawings the reference letter D designates a suitable gatherer of this type for the gathering pins, reference being had more particularly to Fig. 10 which illustrates the details of one of them. The gatherer consists of a vertical hollow tube or cylinder $d$ provided at or about its center with a head $d'$ adapted to ride upon the top faces of the flanges $c^6$ of the associated gathering-bar C, and also provided with a block $d^2$ suitably spaced from and slightly below the head $d'$ and of such size and dimensions as to readily pass through the enlargements $c^5$ of the slots $c^4$ and into the grooves of the bars, so that when the gatherers are assembled in position upon their associated bars the flanges $c^6$ of the bars will occupy the spaces between the heads and blocks overlying the former so that the gatherers may be readily slid or moved along the length of the bars without becoming detached therefrom. The pins $b'$ pass upwardly through the tubes of the gatherers, and are of such length that when the pinboard B is raised their upper ends will pass out of and project above the tops of the tubes, and when the board is lowered their ends will be withdrawn more or less within the tubes. The heads $b^2$ of the pins being slidable upon the upper face of the pin-board, it is obvious that the position of the pins may be expanded and contracted with relation to each other according as the gatherers are moved transversely of the frame on their associated bars, and as the bars are in turn moved lengthwise of the frame with their gatherers.

Any suitable means may be provided to effect the expanding movement of the gatherers along the length of their associated bars, it being understood the gatherers of the end row designated $x$ in the drawings do not move along their bars but are fixed thereon; in the drawings I have shown a suitable means for this purpose which consists in providing the gatherers of each bar with a flexible connecting band or cable $d^3$, the several cables or bands extending respectively from one of the holders of the $x$ row parallel with and below the gathering-bars and adapted to be wound upon a suitable drum $d^4$ journaled in one of the side pieces of the frame and operated by a suitable crank handle $d^5$. The bands $d^3$ are connected to the gatherers in any suitable way preferably by securing them to the lower faces of the blocks $d^2$, it being understood that the gatherers of each bar are connected in series to their associated band in such manner that they are drawn out or separated along the length of their associated bar at suitable distances apart according to the character of the shirrs when the band is wound upon its drum or otherwise drawn taut, the position of the parts in this respect being illustrated in Fig. 1. This relation of the gatherers and their flexible connecting bands permits the gatherers to be readily slid along their bars by any suitable means in one direction in order to assume the contracted or closed position shown in Fig. 2, and by means of their bands they may be drawn along their bars to the expanded or open position shown in Fig. 1. By this arrangement the associated gatherers of each row are adapted to be expanded and contracted in their positions with relation to the fixed end gatherer of that row, while all of the gatherers of each row may be moved longitudinally of the frame by the movement of their associated bar C.

The gatherers are arranged in parallel longitudinal rows or banks and in parallel transverse rows or banks, and the gatherers of each third (considering them as opened or expanded as in Fig. 1) longitudinal row or bank (designated $y$ on Fig. 1) are adapted to be shifted or moved laterally with respect to their associated bars after the gatherers are closed or contracted. For this purpose the bars C, at points where the gatherers of the rows $y$ stand in closed position, are provided with lateral grooves $c^8$, extending from slots $c^4$ through the top flanges $c^6$ adjacent to the next bar, and with opening $c^9$ in the corresponding side below and undercutting the flanges and extending into but not through the lateral wing $c^7$, this arrangement being illustrated in Figs. 1, 9 and 11. The top flanges of the bars of adjacent rows are recessed as at $c^{10}$ adjacent the grooves $c^8$ and undercut as at $c''$ in line with the openings $c^9$ to form seats into which the tubes and the blocks respectively of row $y$ enter when their gatherers are moved to pass their tubes within the lateral grooves $c^8$, the heads of these gatherers being elongated to bridge across between the bars.

It is of course obvious that any number of rows or banks of gatherers may be employed, depending upon the size of the piece of material shirred, and while I have shown only a limited number they may be multiplied or duplicated as the occasion demands.

A suitable follow-board or alining-board may be employed in order to hold the material in place upon the gatherers. This follow-board may be of any suitable form for this purpose, and at Fig. 12 I have shown a board which may be so used, and which consists of sides and ends $e$ and $e'$ respectively, and a series of longitudinally extending strips $e^2$ suitably spaced apart and adapted to enter between the rows of gatherers. One of the end pieces of the follow-board may be provided with suitable hooks $e^3$ adapted to detachably engage correspondingly shaped sockets $e^4$ on the frame.

While the preferred construction contemplates the pins movable in the gatherers, it is obvious that the parts $d$ may be in the form of points or pins to pass through the cloth, as in Fig. 13, thereby constituting the gatherers and dispensing with the present arrangement of pin-board and pins. Other changes and modifications may be made without departing from my invention.

The method of producing shirrs in cloth or other fabrics by the use of my invention, is as follows:—A suitable piece of material of sufficient size to produce the desired shirred surface is positioned with its face downward upon the gatherers when the same are expanded or drawn out to the position indicated in Fig. 1, the pins being withdrawn within the tubes of the gatherers by lowering the pin-board B by means of its operating cams. The material to be shirred is preferably secured in position upon the gatherers by any suitable means, as by tacking it at its corners to the gatherers D, it thereby being stretched in position over the gatherers. The pin-board B is then raised to cause the pins $b'$ to pass out of their tubes and through the material to the position shown in Fig. 4. The gatherers are then contracted to the position shown in Fig. 2, this being accomplished by moving each row of gatherers along its associated bar, and moving the several bars to the abutting position shown in Fig. 2, it being obvious that these movements may be accomplished in either sequence and by any suitable means; I have found by practical experience that this can be readily accomplished by hand, the operator merely pushing the parts to their contracted or closed position. The lateral contraction or closing of the parts as described, causes the gatherers of the row next to row $x$ to move into alinement with those of row $x$, and the gatherers of the first row $y$ abut against those of this consolidated row; the gatherers of the next two rows likewise consolidate into a single row, against which those of the second $y$ row abut in turn, this consolidation and collocation occurring across the several rows (more or less, as the case may be) of gatherers employed. The longitudinal and transverse movements of the gatherers produce a puckering or fulling of the material or fabric between the sets of pins, and the stock thus provided by the puckering or fulling of the material may be depressed (as by hand) between the gatherers, thereby producing puffs or shirrs in the face of the material or fabric. The shirr may be set or fixed by means of a suitable backing which may be then spread over the material, passing the same over the pins and bringing it down into position upon the material by means of the follow-board or other suitable means. The backing and shirred material may then be secured together as by sewing or by any other suitable means through the two thicknesses of material at or near the pins at the margin of the shirrs. To facilitate this sewing operation, I preferably lower the pin-board part way by means of its cams, so that the pins will not project far enough above the top ends of their tubes to interfere with the sewing operation. When it is desired to make an irregular form of shirring the gatherers of the rows $y$ may be shifted with respect to the consolidated rows which remain stationary, this movement being permitted by the grooves and openings $c^8$ and $c^9$ in the sides of their bars; this position is illustrated at Fig. 6 and the resulting effect is shown at Fig. 3, the tubes or pins (as the case may be) passing through the openings $c^8$ and into the seats $c^{10}$, while the blocks $d^2$ pass into the openings $c^9$ in the sides of their bars and enter the recesses $c''$ in the side of the adjacent bar. This produces a shirring which is irregular in outline or form though uniform in appearance or pattern and resembles in outline a reproduction of the pattern of a clover leaf. Other and various irregular patterns or forms may be produced by varying the positions of the gatherers.

Having described my invention what I claim is:—

1. In a device for shirring fabrics, a frame, a series of gatherers arranged in parallel longitudinal and transverse rows, certain of the gatherers adapted to be moved longitudinally and others longitudinally and transversely to produce a puckering or fulling of the fabric, and means for moving certain of the gatherers transversely to adjacent ones.

2. In a device for shirring fabrics, a frame, a series of gatherers arranged in parallel longitudinal and transverse rows, certain of the gatherers adapted to be moved longitudinally and others transversely to produce a puckering or fulling of the fabric, and means for moving certain of the gatherers parallel with adjacent ones.

3. In a device of the class described, a frame, a series of gathering-bars arranged at intervals in predetermined expanded relation on the frame and adapted to be laterally moved to contracted relation, a series of gatherers arranged in predetermined expanded relation longitudinally on the bars and adapted to be moved on the bars to contracted relation.

4. In a device of the class described, a frame, a series of slotted gathering-bars movably mounted in the frame to contract their relation, and a series of gatherers movably mounted in the slots of the bars to contract their relation along the bars.

5. In a device of the class described, a frame having ways, a series of gathering-bars movably mounted in the ways to contract their relation, and a series of gatherers movably mounted on the bars to contract their relation along the bars.

6. In a device of the class described, a frame, a series of slotted gathering-bars movably mounted in the frame, and a series of gatherers movably mounted on the bars to contract their relation along the bars and provided with pins.

7. In a device of the class described, a frame, a series of gathering-bars movably mounted in the frame, and a series of gatherers movable longitudinally on the bars, certain of the gatherers being also movable laterally of the bars.

8. In a device of the class described, a frame, a series of slotted gathering-bars movably mounted in the frame and having passages connecting with the slot, and a series of gatherers movable in the slots of the bars, certain of the gatherers also movable in the passages.

9. In a device of the class described, a frame, a series of slotted gathering-bars movably mounted in the frame and having lateral passages, and a series of gatherers having blocks movable on the bars and into the lateral passages.

10. In a device of the class described, a frame, a series of grooved and slotted gathering-bars movably mounted in the frame and having lateral passages, and a series of gatherers having blocks movable in the grooves and passages, and also having pins extending through the slots.

11. In a device of the class described, a frame, a series of gathering-bars movably mounted in the frame, cables connecting the bars for spacing them at predetermined distances apart, a series of gatherers movable on the bars, and cables connecting the gatherers in series to space them at predetermined distances on the bars.

12. In a device of the class described, a frame, a series of parallel gathering-bars movably mounted in the frame to contract their relation, and a series of gatherers adapted to be moved on the bars to opened and closed position to expand and contract their relation along the bars.

13. In a device of the class described, a frame, a series of gathering-bars adapted to be moved to opened and closed position, gatherers adapted to be moved on the bars to opened and closed position along the bars.

14. In a device of the class described, a frame, a series of gathering-bars mounted in the frame and adapted to be moved longitudinally of the frame to opened and closed position, and a series of gatherers adapted to be moved longitudinally on the bars to opened and closed position along the bars.

In testimony whereof I affix my signature in presence of two witnesses.

ALBERT F. MROCK.

Witnesses:
J. McRoberts,
George R. Harbaugh.